(12) United States Patent
Tang et al.

(10) Patent No.: US 11,254,604 B2
(45) Date of Patent: Feb. 22, 2022

(54) HIGH-MODULUS GLASS FIBER COMPOSITION BASED ON BASALT

(71) Applicant: TAISHAN FIBERGLASS INC., Taian (CN)

(72) Inventors: Zhiyao Tang, Taian (CN); Yuewu Hu, Taian (CN); Yongyan Li, Taian (CN)

(73) Assignee: TAISHAN FIBERGLASS INC., Taian (CN)

( * ) Notice: Subject to any disclaimer, the term of this patent is extended or adjusted under 35 U.S.C. 154(b) by 321 days.

(21) Appl. No.: 16/624,786

(22) PCT Filed: Jun. 6, 2019

(86) PCT No.: PCT/CN2019/090241
§ 371 (c)(1),
(2) Date: Dec. 19, 2019

(87) PCT Pub. No.: WO2020/007159
PCT Pub. Date: Jan. 9, 2020

(65) Prior Publication Data
US 2021/0276916 A1    Sep. 9, 2021

(30) Foreign Application Priority Data

Jul. 3, 2018  (CN) .......................... 201810711078.2

(51) Int. Cl.
*C03C 13/06*    (2006.01)
(52) U.S. Cl.
CPC ................... *C03C 13/06* (2013.01)
(58) Field of Classification Search
CPC .......... C03C 3/087; C03C 13/00; C03C 13/06
See application file for complete search history.

(56) References Cited

U.S. PATENT DOCUMENTS

| | | |
|---|---|---|
| 4,396,722 A | 8/1983 | Rapp |
| 9,714,189 B2 | 7/2017 | Li |
| 2003/0166446 A1 | 9/2003 | Lewis |
| 2013/0217822 A1 | 8/2013 | Hofmann et al. |
| 2015/0315068 A1 | 11/2015 | Clatot et al. |

FOREIGN PATENT DOCUMENTS

| | | |
|---|---|---|
| CN | 1126985 A | 7/1996 |
| CN | 102390934 A | 3/2012 |
| CN | 106396421 A | 2/2017 |
| CN | 106927672 A | 7/2017 |
| CN | 108751728 A | 11/2018 |
| EP | 3819270 A1 | 5/2021 |
| JP | 2003171143 A | 6/2003 |
| JP | 2003321247 A | 11/2003 |
| JP | 2007217192 A | 8/2007 |
| JP | 2016501822 A | 1/2016 |
| RU | 2418752 C2 | 5/2011 |
| RU | 2641808 C2 | 1/2018 |
| SU | 649670 A1 | 2/1979 |
| WO | 03076354 A1 | 9/2003 |
| WO | 2005073141 A1 | 8/2005 |
| WO | 2020007159 A1 | 1/2020 |

OTHER PUBLICATIONS

The Japan Patent Office (JPO) Notice of Reasons for Refusal for JP Application No. 2019-568110 Mailing date of the OA dated Jan. 26, 2021 6 pages (with translation).
Canadian Intellectual Property Office (CIPO) Office Action and Examination Search Report for CA Application No. 3,065,070 Mailing date of the OA dated Mar. 24, 2021 3 pages.
Korean Intellectual Property Office (KIPO) Notification of Reason for Refusal for KR Application No. 10-2019-7036055 Mailing date of the OA dated Nov. 20, 2020 5 pages (with translation).
Russian Agency For Industrial Property, Patents, and Trade Marks (Rospatent) Federal Institute of Industrial Property Office Action for Application No. 2021100418/05(000724) dated Aug. 27, 2021 12 pages (with translation).
World Intellectual Property Organization (WIPO) International Search Report for PCT/CN2019/090241 dated Aug. 30, 2019 6 Pages.

*Primary Examiner* — Elizabeth A. Bolden
(74) *Attorney, Agent, or Firm* — Anova Law Group, PLLC

(57) ABSTRACT

A high-modulus glass fiber composition based on basalt includes components with contents in mass percentage satisfying $SiO_2$: 53.0%-60.0%; $Al_2O_3$: 24.5%-28.0 %; MgO: 8%-15.0%; $Fe_2O_3$: 1.5%-5.5%; $TiO_2$: 2.0%-4.0%; $0<CaO\leq5.0\%$; and $0<Na_2O+K_2O\leq2.0\%$.

11 Claims, No Drawings

HIGH-MODULUS GLASS FIBER COMPOSITION BASED ON BASALT

CROSS-REFERENCE TO RELATED APPLICATIONS

The present application is a national stage entry under 35 U.S.C. § 371 of International Application No. PCT/CN2019/090241, filed on Jun. 6, 2019, which claims priority to Chinese Patent Application No. 201810711078.2 filed to CNIPA on Jul. 3, 2018 and entitled "HIGH-MODULUS GLASS FIBER COMPOSITION BASED ON BASALT", the entire contents of both of which are incorporated herein by reference.

TECHNICAL FIELD OF THE PRESENT INVENTION

The present disclosure belongs to the technical field of glass fibers, and particularly relates to a high-modulus glass fiber composition based on basalt.

BACKGROUND OF THE PRESENT INVENTION

Due to its excellent characteristics such as high temperature resistance, corrosion resistance, high strength, low specific weight, low moisture absorption, low extensibility and high insulation, the glass fiber has been widely applied in high-tech industries, for example, electronics, communication, nuclear energy, aviation, aerospace, weapons, naval vessel and ocean development, and genetic engineering.

The basalt fiber has excellent characteristics such as high strength modulus, high temperature resistance, chemical corrosion resistance and the like. However, the production of the basalt fiber is difficult. The basalt fiber has high fiber forming temperature, high crystallization upper temperature, fast crystallization rate, poor heat permeability, low production efficiency and high production cost. Although the basalt fiber has emerged for more than sixty years, it is still impossible to realize the large-scale and high-efficiency production of fiber glass.

Based on the above problems, it is urgent to develop a glass fiber composition with high modulus and low crystallization temperature.

SUMMARY OF THE PRESENT INVENTION

An objective of the present disclosure is to provide a high-modulus glass fiber composition based on basalt, with high modulus, high mechanical strength and low crystallization temperature.

The contents of the components of the high-modulus glass fiber composition based on basalt provided by the present disclosure, in mass percentage, are as follows:
$SiO_2$: 53.0%-60.0%;
$Al_2O_3$: 24.5%-28.0%;
MgO: 8.0%-15.0%;
$Fe_2O_3$: 1.5%-5.5%;
$TiO_2$: 2.0%-4.0%;
$0<CaO\leq5.0\%$;
$0<Na_2O+K_2O\leq2.0\%$.
Wherein, the mass percentage of $Na_2O$ is $0<Na_2O\leq1.5\%$, to reduce the glass viscosity and improve the crystallization tendency.

Wherein, the contents of the components of the high-modulus glass fiber composition based on basalt, in mass percentage, are as follows:
$SiO_2$: 53.0-60.0%;
$Al_2O_3$: 24.5%-28.0%;
MgO: 8.0%-15.0%;
$Fe_2O_3$: 1.5%-5.5%;
$TiO_2$: 2.0%-4.0%;
$0<CaO\leq5.0\%$;
$0<Na_2O\leq1.5\%$;
$0<K_2O\leq0.5\%$ Preferably, the contents of components of the high-modulus glass fiber composition based on basalt, in mass percentage, are as follows:
$SiO_2$: 53.0%-60.0%;
$Al_2O_3$: 24.5%-28.0%;
MgO: 8.0%-15.0%;
$Fe_2O_3$: 1.5%-5.5%;
$TiO_2$: 2.0%-4.0%;
$0<CaO\leq5.0\%$;
$0<Na_2O\leq1.5\%$;
$0<K_2O\leq0.5\%$;
$FeO/Fe_2O_3\leq0.6$.

Further, preferably, the contents of the components of the high-modulus glass fiber composition based on basalt, in mass percentage, are as follows:
$SiO_2$: 53.0%-58.0%;
$Al_2O_3$: 24.5%-27.0%;
MgO: 8.0%-12.0%;
$Fe_2O_3$: 1.5%-5.5%;
$TiO_2$: 2.0%-4.0%;
CaO: 3.0%-5.0%;
$0<Na_2O\leq1.5\%$;
$0<K_2O\leq0.5\%$;
$FeO/Fe_2O_3\leq0.6$.

Wherein:
The mass percentage of the MgO and $Al_2O_3$ is MgO+$Al_2O_3\geq33\%$, which ensures the high modulus of glass.

The mass percentage of the MgO and $Al_2O_3$ is $0.35\leq MgO/Al_2O_3\leq0.5$, which ensures that the glass has the low crystallization temperature.

The mass percentage of the $SiO_2$ and $Al_2O_3$ is $2.1\leq SiO_2/Al_2O_3\leq3.5$, which ensures the easy formation of glass and the high modulus of glass.

The mass percentage of the FeO and $Fe_2O_3$ is $0.4\leq FeO/Fe_2O_3\leq0.5$, which ensures the stability of glass modulus. The glass containing iron components generally contains FeO, so the 1.5% to 5.5%, content of $Fe_2O_3$ in the formulation is actually the total contents of $Fe_2O_3$ and FeO.

The content of CaO is preferably 3.0% to 5.0%, so that the fiber forming temperature of glass is reduced and a high mechanical strength is provided for the glass.

The modulus of the high-modulus glass fiber composition is 93 to 95 GPa.

There are no toxic components such as BeO added in the glass fiber composition to improve the modulus of the glass, and all components are non-toxic and harmless and meet the national requirements of environmental protection.

The high-modulus glass fiber composition based on basalt may be made from the following raw materials: basalt, kaolinite, quartz powder, titanium dioxide, quicklime, magnesium oxide, anhydrous sodium sulfate.

The main raw materials in the glass fiber composition are basalt and kaolinite with low cost, so the cost of the raw materials is greatly reduced in comparison to other high-modulus formulations.

The present disclosure has the following beneficial effects.

$Al_2O_3$ and MgO in the glass are important components for improving the modulus. In an allowable range of crystallization temperature, increasing the contents of the two components $Al_2O_3$ and MgO can effectively improve the modulus of the glass. However, the increase of the content of $Al_2O_3$ will also increase the fiber forming temperature and the crystallization upper temperature of the glass. In a $SiO_2$—$Al_2O_3$—MgO—$Fe_2O_3$—CaO five-member system, when the content of $Al_2O_3$ is 24.5% to 28.0%, the Young's modulus is relatively high, and the crystallization is acceptable. If the content of $Al_2O_3$ increases again, Al will change in coordination, the crystallization upper temperature of the glass rises noticeably, and the crystallization rate is very fast, and the crystals can grow up in 2 h. Such a rapid crystallization rate will result in a large amount of crystallization, and the forming operation cannot be performed normally. In the present disclosure, the content of $Al_2O_3$ preferably is 24.5% to 27.0%.

In the glass structure, MgO is a component outside the network structure. Most of MgO is located in an octahedron of the glass, and the modulus of the glass can be significantly improved. However, the crystallization of the glass will be facilitated noticeably, and the crystallization temperature of the glass will also be increased. Particularly when the content of MgO exceeds 15%, the crystallization of the glass will be accelerated significantly, and the crystallization upper temperature is considerably high, even exceeding the forming temperature of the glass. In the present disclosure, the influence of MgO on the crystallization upper temperature is particularly sensitive. Every 0.5% increase of MgO content will result in an increase in the crystallization upper temperature by 8° C. to 15° C. Since the glass viscosity in the present disclosure is relatively low, the crystallization upper temperature must be controlled within 1300° C. In the present disclosure, the content of MgO preferably is 8.0% to 12.0%.

As the main body of the glass network structure, $SiO_2$ is a main component of the glass. The content of $SiO_2$ is 53.0% to 60.0%. $SiO_2$ can effectively improve the mechanical strength, temperature resistance and chemical stability of the glass fiber. However, the increase in the content of $SiO_2$ will noticeably increase the clarification temperature and fiber forming temperature of the glass. In order to ensure that the glass has good clarification temperature and fiber forming temperature, in the present disclosure, the content of $SiO_2$ preferably is 53.0% to 58.0%.

In order to ensure the modulus of the glass, in the present disclosure, the mass percentage of MgO and $Al_2O_3$ satisfies MgO+$Al_2O_3 \geq 33\%$. Meanwhile, in order to control the forming temperature and crystallization temperature of the glass, the optimal formulation is adjusted, and the ratio of MgO/$Al_2O_3$ is controlled to be 0.35 to 0.5. Additionally, in the present disclosure, the ratio of $SiO_2$/$Al_2O_3$ should be controlled to be 2.1 to 3.5, to further ensure easy formation of the glass and high modulus of the glass.

In the glass structure, CaO is also a component outside the network structure. CaO can reduce the fiber forming temperature of the glass. However, the excessive content of CaO will increase the brittleness of the glass and be disadvantageous for the increase of modulus. In the present disclosure, the content of CaO is 0 to 5.0%. A proper content of Ca will improve the density of the glass and also improve the mechanical strength of the glass. In the present disclosure, considering the comprehensive performance of the glass in the formulation design, the content of CaO preferably is 3.0% to 5.0%.

$Fe_2O_3$ is an important point to distinguish the present disclosure from other high-modulus glasses. $Fe_2O_3$ can effectively improve the modulus of the glass, and can reduce the fiber forming temperature of the glass. The addition of this component is the highlight of the present disclosure. Due to the high content of $Al_2O_3$ and the low content of CaO, the glass has the problems of high forming temperature, difficult melting, difficult bubble discharge and the like. In the present disclosure, by increasing the content of $Fe_2O_3$, these issues will be improved noticeably, the glass has better clarification effect and fewer bubbles at a high temperature, the impact resistance of the glass is improved, and it is advantages for the increase of modulus to a certain extent. However, as the content of $Fe_2O_3$ increases, particularly when the content of $Fe_2O_3$ is higher than 5.5%, the glass easily undergoes phase separation and becomes rich in iron and silicon, the performance of the glass is greatly influenced. In this case, it is necessary to properly adjust the contents of $Al_2O_3$, MgO and other components to improve this problem.

The content of $Fe_2O_3$ has almost no influence on the crystallization upper temperature and crystallization rate of the glass. However, with the increase of the content of $Fe_2O_3$, the forming temperature of the glass will be reduced noticeably. In this way, the difference $\Delta T$ between the fiber forming temperature and the crystallization upper temperature will be reduced. Since $\Delta T$ is generally greater than or equal to 30° C., the content of $Fe_2O_3$ should not be too high. As such, in the present disclosure, the content of $Fe_2O_3$ is 1.5% to 5.5%.

The Fe element in $Fe_2O_3$ exists in the glass in forms of $Fe^{3+}$ and $Fe^{2+}$. $Fe^{3+}$ strongly absorbs ultraviolet light at wavelengths of 225 nm, 380 nm, 420 nm and 435 nm, so that the glass shows yellow green. $Fe^{2+}$ strongly absorbs near-infrared light at a wavelength of 1050 nm. Since the strong infrared absorption band extends to the visible light, $Fe^{2+}$ makes the glass blue-green, and the coloring capability of $Fe^{2+}$ is 10 to 15 times of that of Fe'. Because $Fe^{2+}$ and $Fe^{3+}$ have different absorption bands and different coloring capabilities, the color of the glass can be changed by controlling the ratio of $Fe^{2+}$ to $Fe^{3+}$ in the actual production.

In the present disclosure, the content of FeO should be controlled. When the value of FeO/$Fe_2O_3$ is higher than 0.6, the glass is low homogeneity, has stripes visible to naked eyes and is low in modulus stability. Therefore, in the present disclosure, the value of FeO/$Fe_2O_3$ should be controlled below 0.6 and is adjusted by oxidizing substances such as $TiO_2$.

In the production process, the content of $Fe^{2+}$ is high, the heat permeability is poor, and the temperature difference between upper and lower layers of the glass liquid is large. Therefore, during the production of the glass fiber composition in the present disclosure, this characteristic should be taken into consideration in the furnace design. The depth of the furnace should be as shallow as possible on the premise of satisfying the needs, and there must be process systems matching the furnace, for example, mounting a bubbler on the bottom of the melting furnace, adjusting the energy distribution of electric fluxing and burning guns. In short, to ensure the melting, clarification and homogenization effects of the glass liquid, the temperature of the glass liquid on the bottom of the furnace should be well controlled.

In the present disclosure, due to the relatively high content of $Fe_2O_3$, the color of the glass fiber composition is close to black brown. Therefore, the glass fiber composition of the present disclosure is suitable for applications of glass and composite material products with high modulus and color insensitivity.

In the present disclosure, the introduction of $Na_2O$ and $K_2O$ has a great effect on the reduction of glass viscosity and the improvement of crystallization tendency. Meanwhile, the presence of $Na_2O$ and $K_2O$ has a good fluxing effect on glass, and reduces the difficulty of melting and clarification to a certain extent. In the present disclosure, the total contents of $Na_2O$ and $K_2O$ are controlled to be 0 to 2.0%.

In the silicate glass, Ti of $TiO_2$ usually exists in a tetravalent state. It is generally located in the octahedron of the glass and is ions outside the network. $TiO_2$ can reduce the fiber forming temperature of the glass and has a certain fluxing effect, and can also reduce the thermal expansion coefficient of the glass within a certain range and improve of the density of the glass, so that the modulus of the glass can be improved to a certain extent. In addition, $TiO_2$ itself presents in a tetravalent form and has certain oxidizability, so the addition of $TiO_2$ can adjust the ratio of $FeO/Fe_2O_3$ and contribute to ensuring the homogeneity of the glass. Therefore, in the present disclosure, the content of $TiO_2$ is 2.0% to 4.0%.

The modulus of the high-modulus glass fiber composition based on basalt in the present disclosure is 93 to 95 GPa. The glass fiber composition provided by the present disclosure is made from basalt raw mineral material and glass fiber raw mineral material. The introduction of a considerable proportion of the $Fe_2O_3$ component, particularly $FeO/Fe_2O_3 \leq 0.6$, makes that the basalt glass fiber provided by the present disclosure has the characteristics of high strength, high modulus and the like specific to the basalt glass fiber, and has the advantage of high-efficiency industrial production of the glass fiber.

Another aspect of the present disclosure further provides a glass fiber made from the glass fiber composition provided by the present disclosure.

DETAILED DESCRIPTION OF THE PRESENT INVENTION

The present disclosure will be further described below by embodiments.

Embodiments 1-8

In Embodiments 1-8, the components of the high-modulus glass fiber composition based on basalt are shown in Table 1.

In accordance with the contents of the components, different raw materials are prepared and mixed; the mixed raw materials are melted and clarified in a furnace at 1550±50° C. to obtain the high-modulus glass fiber composition based on basalt; and, various indexes such as the fiber forming temperature, crystallization upper temperature, ΔT, glass Young's modulus and the number of bubbles of the glass fiber composition after annealing are detected, and the data is shown in Table 1.

Comparison Examples 1-2

In the comparison examples 1-2, the components of the glass fiber composition are shown in Table 1.

The data of various indexes such as the fiber forming temperature, crystallization upper temperature, ΔT, glass Young's modulus and the number of bubbles of the glass fiber composition is shown in Table 1.

TABLE 1

| Component | Embodiment 1 | Embodiment 2 | Embodiment 3 | Embodiment 4 | Embodiment 5 | Embodiment 6 | Embodiment 7 | Embodiment 8 | Comparison example 1 | Comparison example 2 |
|---|---|---|---|---|---|---|---|---|---|---|
| $SiO_2$ | 55.9 | 55 | 54.2 | 54.2 | 56.5 | 54 | 53.5 | 54.2 | 59.4 | 60 |
| $Al_2O_3$ | 25 | 25 | 25 | 24.6 | 24.8 | 25.2 | 24.8 | 25.3 | 18 | 21 |
| CaO | 4.2 | 4 | 4.9 | 1.8 | 3 | 2 | 1.3 | 3.5 | 11 | 2 |
| MgO | 9 | 9.8 | 9 | 12 | 9.2 | 12 | 11.5 | 9 | 10 | 12 |
| $Fe_2O_3$ | 1.6 | 2.2 | 2.5 | 3 | 3.5 | 4 | 4.5 | 5.4 | 0.15 | 1 |
| $Na_2O$ | 1.1 | 1.2 | 1.3 | 1.5 | 0.7 | 0.5 | 0.6 | 0.5 | 0.48 | 0.3 |
| $K_2O$ | 0.2 | 0.3 | 0.3 | 0.5 | 0.3 | 0.3 | 0.2 | 0.1 | 0.27 | 0.2 |
| $ZrO_2$ | / | / | / | / | / | / | / | / | 0.7 | / |
| $TiO_2$ | 3 | 2.5 | 2.8 | 2.4 | 2 | 2 | 3.6 | 2 | / | / |
| $B_2O_3$ | / | / | / | / | / | / | / | / | / | 3.5 |
| $FeO/Fe_2O_3$ | 0.42 | 0.46 | 0.43 | 0.44 | 0.45 | 0.48 | 0.49 | 0.48 | / | / |
| Fiber forming temperature, ° C. | 1334 | 1325 | 1315 | 1320 | 1330 | 1325 | 1333 | 1335 | 1300 | 1380 |
| Crystallization upper temperature, ° C. | 1290 | 1285 | 1278 | 1280 | 1275 | 1295 | 1295 | 1280 | 1250 | 1410 |
| ΔT, ° C. | 44 | 40 | 37 | 40 | 55 | 30 | 38 | 55 | 50 | −30 |
| Glass Young's modulus, Gpa | 93.5 | 93.6 | 94.2 | 94.5 | 93.2 | 95.0 | 94.3 | 93.5 | 88 | 92 |
| Number of Bubbles, bubbles/ounce | Not detected | Not detected | Not detected | Not detected | Not detected | Not detected | Not detected | Not detected | 6 | 13 |

In Table 1, the comparison example 1 shows the related data of the H glass, and the comparison example 2 shows the related data of the S glass. It can be known from the data in Table 1 that the modulus of the glass is improved by increasing the content of $Al_2O_3$ and MgO, and the crystallization upper temperatures in Embodiments 1-8 and the comparison examples 1-2 are all relatively high, which is difficult to avoid. In the comparison example 1, $ZrO_2$ is added, and the fiber forming temperature and the crystallization upper temperature are close to the data in Embodiments 1-8; but the Young's modulus is far lower than that in Embodiments 1-8. In the comparison example 2, $B_2O_3$ is added, but the crystallization upper temperature is relatively high, and a series of problems such as crystallization will be caused in the actual production process and it is very difficult to realize scale production.

In the present disclosure, by adding $TiO_2$ and increasing the content of $Fe_2O_3$, the Young's modulus of the glass is improved, the fiber forming temperature and the crystallization upper temperature of the glass are reduced, and the forming temperature of the glass is also reduced, so that a large space is provided to the increase of the content of $Al_2O_3$. However, with the increase of the contents of $TiO_2$ and $Fe_2O_3$, the density of the glass also increases continuously, and the brittleness of the glass also increases, it is disadvantageous for the increase of modulus. Therefore, in the present disclosure, the content of $TiO_2$ is controlled to be 2.0% to 4.0%, and the content of $Fe_2O_3$ is controlled to be 1.5% to 5.5%. In this case, the glass has the highest modulus which is 93 to 95 GPa.

In the present disclosure, the value of $FeO/Fe_2O_3$ is also controlled below 0.6. Since the COD of the basalt raw material is relatively high, causing that the content of carbon in the raw material is relatively high, and it needs to be balanced and adjusted by an oxidizing substance such as $TiO_2$, otherwise, uneven and stripes visible to naked eyes will occur in the glass, and the modulus stability will be influenced.

A glass fiber with excellent performances may be made from the glass fiber composition according to the present disclosure.

INDUSTRIAL APPLICABILITY

In the high-modulus glass fiber composition based on basalt provided by the present disclosure, by introducing a proper content of components $Fe_2O_3$ and $TiO_2$ and by controlling the ratio of ferrous oxide to ferric oxide, the thermal expansion coefficient of the glass is reduced, the density of the glass is improved, and the Young's modulus of the glass fiber is also significantly improved. Moreover, the number of bubbles, the forming temperature and the crystallization upper temperature of the glass can be reduced. Compared with the existing high-modulus glass, the glass fiber composition in the present disclosure has breakthrough process in crystallization temperature and elastic modulus. The crystallization temperature of the glass is reduced, the number of bubbles is small and the elastic modulus is high and stable. The basalt glass fiber has the advantage of high-efficiency industrial production of the glass fiber.

The invention claimed is:

1. A high-modulus glass fiber composition based on basalt, comprising components with contents in mass percentage satisfying following:
   $SiO_2$: 53.0%-60.0%;
   $Al_2O_3$: 24.5%-28.0%;
   MgO: 8.0%-15.0%;
   $Fe_2O_3$: 1.5%-5.5%;
   $TiO_2$: 2.0%-4.0%;
   $0<CaO\leq5.0\%$; and
   $0<Na_2O+K_2O\leq2.0\%$.

2. The high-modulus glass fiber composition based on basalt according to claim 1, wherein $0<Na_2O\leq1.5\%$.

3. The high-modulus glass fiber composition based on basalt according to claim 1, wherein mass percentages of MgO and $Al_2O_3$ satisfy $MgO+Al_2O_3\geq33\%$.

4. The high-modulus glass fiber composition based on basalt according to claim 1, wherein mass percentages of MgO and $Al_2O_3$ satisfy $0.35\leq MgO/Al_2O_3\leq0.5$.

5. The high-modulus glass fiber composition based on basalt according to claim 1, wherein mass percentages of $SiO_2$ and $Al_2O_3$ satisfy $2.1\leq SiO_2/Al_2O_3\leq3.5$.

6. The high-modulus glass fiber composition based on basalt according to claim 1, wherein mass percentages of FeO and $Fe_2O_3$ satisfy $0.4\leq FeO/Fe_2O_3\leq0.5$.

7. The high-modulus glass fiber composition based on basalt according to claim 1, wherein a modulus of the high-modulus glass fiber composition based on basalt is 93 to 95 GPa.

8. A glass fiber made from the glass fiber composition according to claim 1.

9. The high-modulus glass fiber composition based on basalt according to claim 1, wherein the contents of the components in mass percentage satisfy:
   $SiO_2$: 53.0%-60.0%;
   $Al_2O_3$: 24.5%-28.0%;
   MgO: 8.0%-15.0%;
   $Fe_2O_3$: 1.5%-5.5%;
   $TiO_2$: 2.0%-4.0%;
   $0<CaO\leq5.0\%$;
   $0<Na_2O\leq1.5\%$; and
   $0<K_2O\leq0.5\%$.

10. The high-modulus glass fiber composition based on basalt according to claim 9, wherein the contents of the components in mass percentage satisfy:
    $SiO_2$: 53.0%-60.0%;
    $Al_2O_3$: 24.5%-28.0%;
    MgO: 8.0%-15.0%;
    $Fe_2O_3$: 1.5%-5.5%;
    $TiO_2$: 2.0%-4.0%;
    $0<CaO\leq5.0\%$;
    $0<Na_2O\leq1.5\%$;
    $0<K_2O\leq0.5\%$; and
    $FeO/Fe_2O_3\leq0.6$.

11. The high-modulus glass fiber composition based on basalt according to claim 10, wherein the contents of the components in mass percentage satisfy:
    $SiO_2$: 53.0%-58.0%;
    $Al_2O_3$: 24.5%-27.0%;
    MgO: 8.0%-12.0%;
    $Fe_2O_3$: 1.5%-5.5%;
    $TiO_2$: 2.0%-4.0%;
    CaO: 3.0%-5.0%;
    $0<Na_2O\leq1.5\%$;
    $0<K_2O\leq0.5\%$; and
    $FeO/Fe_2O_3\leq0.6$.

* * * * *